Aug. 31, 1926.                                                      1,598,411
R. ALLEN
ROTARY BRUSH
Filed April 2, 1925
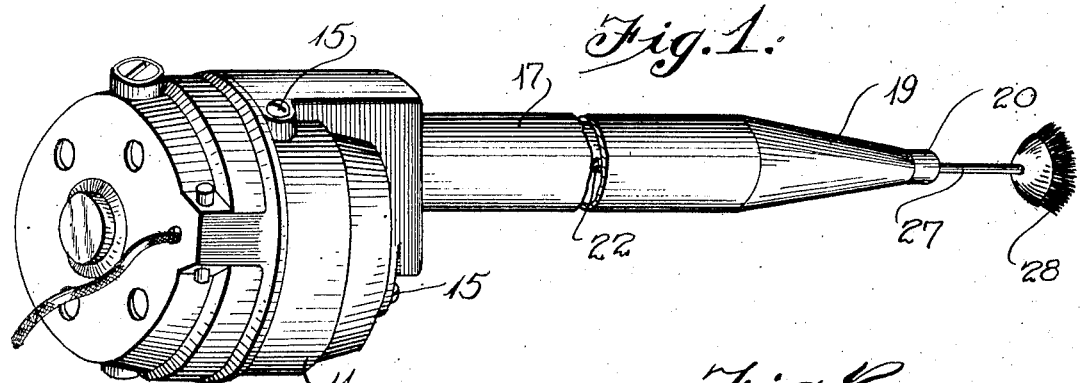
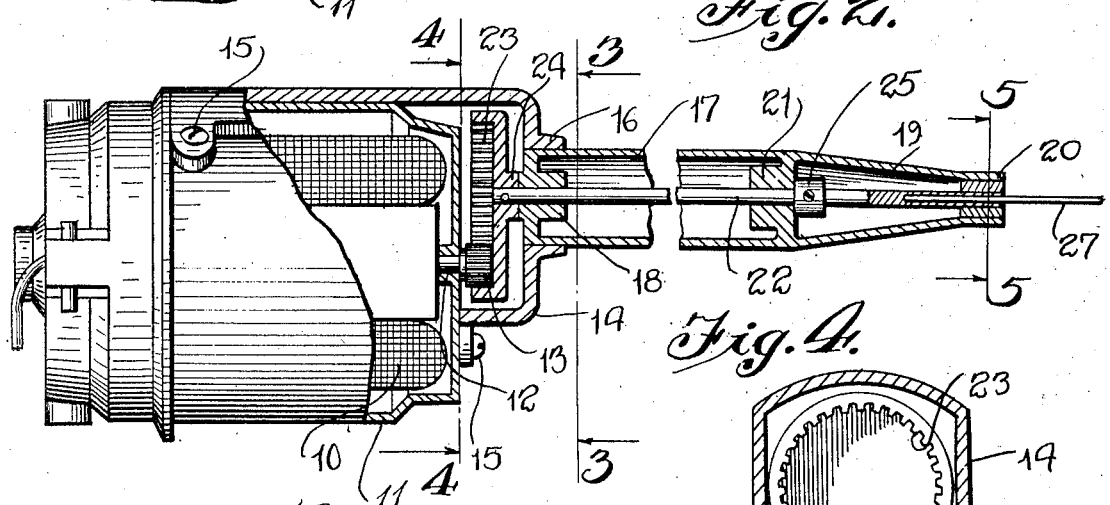
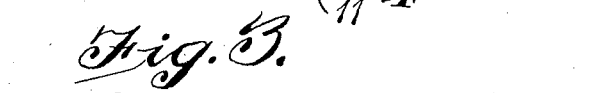
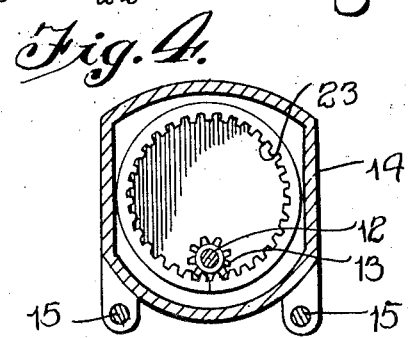
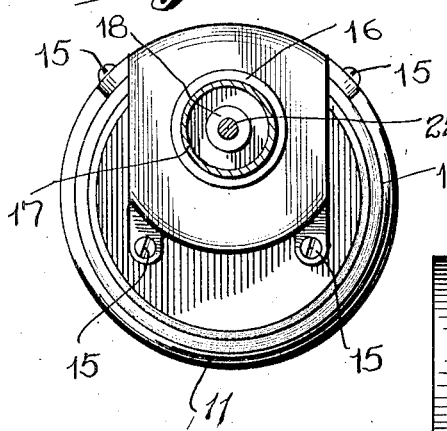
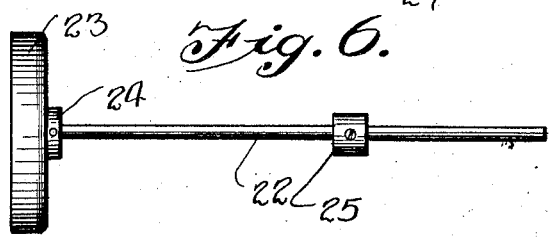
INVENTOR.
Raymond Allen.
BY
A. B. Foster
ATTORNEY Patented Aug. 31, 1926.

1,598,411

UNITED STATES PATENT OFFICE.

RAYMOND ALLEN, OF HUTCHINSON, KANSAS.

ROTARY BRUSH.

Application filed April 2, 1925. Serial No. 20,265.

This invention relates to tooth brushes and the like and has special reference to a motor driven portable tooth brush.

One important object of the invention is to improve the general construction of devices of this character.

A second important object of the invention is to provide an improved device of this kind wherein the brush and its supporting parts may be readily detached as a unit from the motor and its casing.

A third important object of the invention is to provide improved means for supporting the brush shaft in such a device.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and Figure 1 is a perspective view of the entire device, the tubular portion being broken out in the middle to enable the same to be shown to large scale.

Figure 2 is a side elevation of the device partly in section.

Figure 3 is a section on the line 3—3 of Figure 2.

Figure 4 is a section on the line 4—4 of Figure 2.

Figure 5 is a section on the line 5—5 of Figure 2.

Figure 6 is a view of the brush shaft and internal gear.

In the present embodiment of the invention there is employed a motor 10 having a casing 11 completely surrounding the motor and forming a hand grip. This casing is of the ordinary substantially cylindrical form and through one end of the casing projects one end of the motor shaft 12, a pinion 13 being fixed on this projecting forward end.

At 14 is a gear casing which has an open side shaped to conform to the shape of the casing 11 and which is detachably secured to said motor casing by means of screws 15. This casing has an opening disposed centrally of its forward face and surrounded by a flange or collar 16.

Fitted within this collar 16 is the rear end of a tubular shaft housing 17, said rear end being provided with a bearing 18. The forward end of this housing is first tapered as at 19 and then prolonged into a cylindrical portion 20. At the rear of the tapered portion the housing is provided with a bearing 21. Supported in the bearings 18 and 21 is a shaft 22 which projects into the gear housing 14 and carries at its rear end an internal gear 23 having a hub 24 which bears against the bearing 18. A collar 25 is held on this shaft in front of bearing 21. Thus the shaft is prevented from longitudinal movement in its housing. The shaft 22 has its forward end supported in a split bushing 26 and this forward end is provided with a socket for the reception of the stem or shank 27 of a brushing tool 28.

From the foregoing it will be seen that the gear housing may be entirely removed from the motor and the parts readily separated for cleaning or replacement.

There has thus been provided a simple and efficient device of the kind described and for the purpose specified.

It is obvious that minor changes may be made in the form and construction of the invention without departing from the material spirit. thereof. It is not, therefore, desired to confine the invention to the exact form herein shown and described, but it is desired to include all such as properly come within the scope claimed.

Having thus described the invention, what is claimed as new, is:

In a motor driven tool, a motor casing through which one end of the motor shaft may project, a gear casing having an open side conforming in shape to the motor casing and detachably secured thereto, said gear casing having an opening in its forward face and being provided with a collar surrounding said opening, a tubular shaft housing having its rear end fitted within said collar and projecting forwardly therefrom, said shaft housing having a tapered forward end and a cylindrical rear end, shaft bearings formed in said housing at the front and rear ends of the cylindrical portion of the housing, said housing having its forward end of sufficient internal diameter to permit passage of a shaft collar therethrough, and a bushing in said forward end adapted to form a third bearing for a shaft mounted in the first two bearings.

In testimony whereof I affix my signature.

RAYMOND ALLEN.